United States Patent

[11] 3,624,230

| | | |
|---|---|---|
| [72] | Inventor | Albert H. Robinson, Jr.<br>Plymouth Meeting, Pa. |
| [21] | Appl. No. | 811,941 |
| [22] | Filed | Apr. 1, 1969 |
| [45] | Patented | Nov. 30, 1971 |
| [73] | Assignee | Campbell Soup Company<br>Camden, N.J. |

[54] PROCESS FOR CONTINUOUSLY SCRAMBLING EGGS
8 Claims, 3 Drawing Figs.

[52] U.S. Cl. ............................................. 99/113, 99/216
[51] Int. Cl. ............................................. A23l 1/32
[50] Field of Search ............................................. 99/113, 196, 182, 216

[56] References Cited
UNITED STATES PATENTS

| 1,385,246 | 7/1921 | Crocker | 99/113 |
| 2,766,126 | 10/1956 | Hawk | 99/113 |
| 2,999,024 | 9/1961 | Stimpson et al. | 99/113 |

*Primary Examiner*—Raymond N. Jones
*Assistant Examiner*—Robert M. Elliott
*Attorney*—Howson and Howson ABSTRACT: A process for continuously scrambling eggs to produce a product having a pleasing taste and appearance in which an egg slurry is preheated to a temperature below its coagulation point before it is introduced into a coagulating-chamber. Jets of steam are directed against the slurry as it passes through the chamber to coagulate the egg slurry. The supply of steam to the chamber is regulated to maintain the temperature of the cooked product substantially within the range of 175° to 195° F. as it is discharged from the chamber to insure the formation of a product which has a good overall appearance and pleasant taste.

INVENTOR:
ALBERT H. ROBINSON, JR.
BY
Howson & Howson
ATTYS.

PROCESS FOR CONTINUOUSLY SCRAMBLING EGGS

The present invention relates to a method and apparatus for continuously scrambling eggs which after reheating at time of consumption retain the typical appearance and pleasant taste of eggs scrambled in small quantities in a frying pan.

The prior art, in the form of U.S. Pat. Nos. 2,766,126 and 2,999,024, teaches several processes for continuously cooking egg preparations to form a product such as canned egg yolk for babies. These processes require the egg preparation to be heated to sterilization temperature (212° to 280° F.) which would render scrambled eggs in their familiar form tough and unappetizing. U.S. Pat. No. 2,682,827 also discloses that steam may be used in a tubular apparatus to sterilize an egg preparation. However, the prior art fails to disclose how an egg slurry may be cooked as part of a continuous operation so as to coagulate the continuously flowing slurry into small particles without raising the temperature to the point where the appearance and taste of the familiar scrambled egg product is adversely affected.

Therefore, it is the primary object of this invention to provide a process for continuously coagulating and cooking an egg slurry so that it retains the pleasing taste and texture of eggs scrambled in small quantity such as in a frying pan.

It is a further object of this invention to provide a process and apparatus which will continuously scramble and coagulate the egg slurry at a desired rate without burning the eggs on a heating surface and without diluting the final product which would detract from its appearance and taste.

It is a further object of this invention to provide a process as described which will permit the scrambled eggs to be automatically dispensed into trays and which can be frozen and later reheated by the consumer while preserving the attractive appearance and taste of the final egg product.

More particularly, in the preferred form of the present invention, a batch of frozen eggs is mixed with milk and butter to form a slurry which is heated to substantially 140° F. The homogenized slurry is admitted into a coagulating-chamber where jets of steam are directed against the slurry as it passes therethrough to scramble and cook the egg slurry. The supply of steam to the coagulating-chamber is automatically regulated by controller means connected between a valve in a steam supply line and a temperature sensor means which measures the temperature of the cooked product as it is discharged from the bottom of the coagulating-chamber. The controller means is set to maintain the temperature of the cooked product within the range of 175° to 195° F. when the constituents of the slurry are as described herein. The scrambled egg product may then be packaged and frozen for subsequent reheating and consumption.

In addition to these objects, other objects, features and advantages of the present invention will become apparent from the following description when taken in conjunction with the accompanying drawings, in which.

Figure 1:
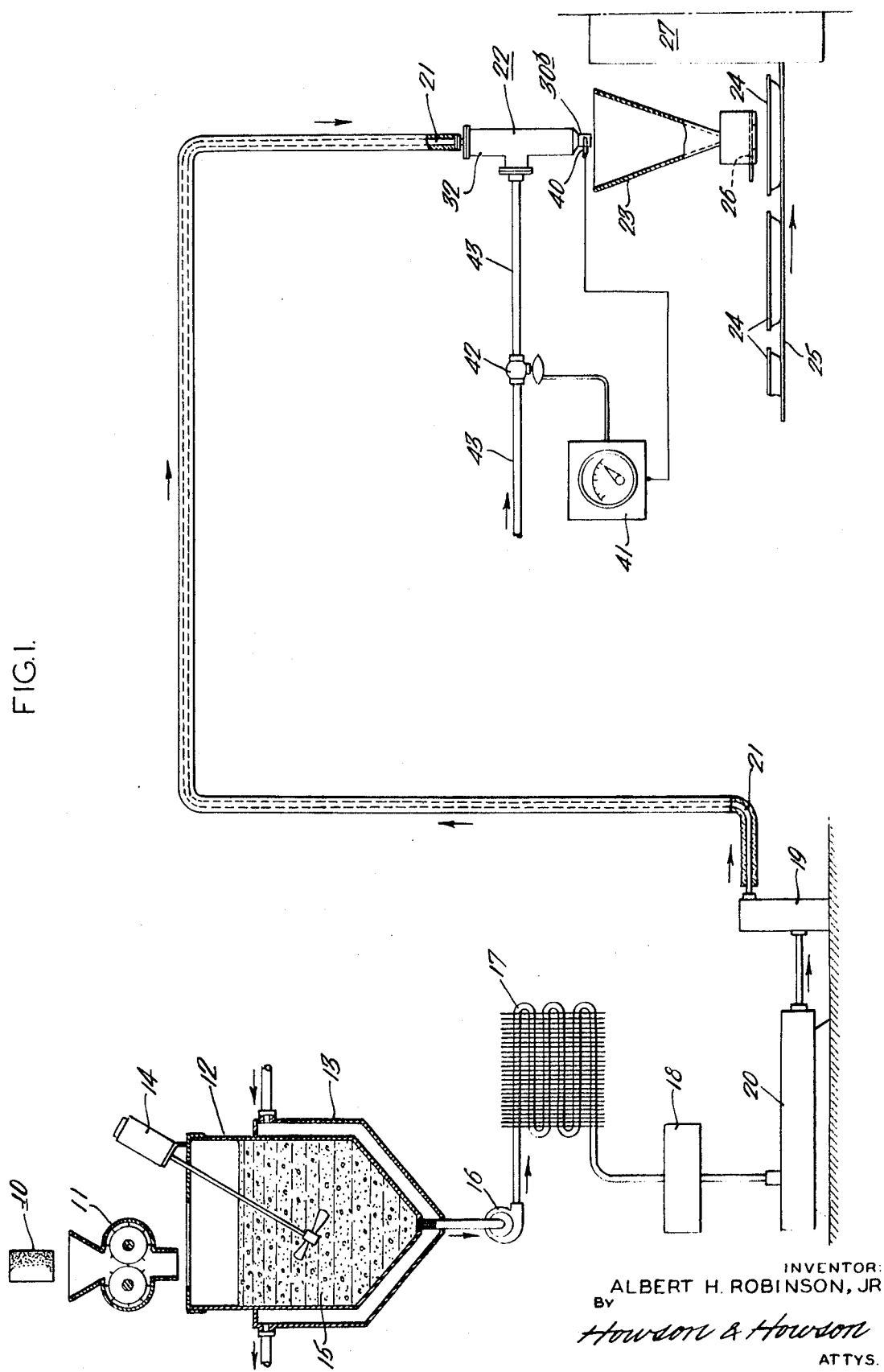
FIG. 1 is a schematic view of the preferred form of apparatus for scrambling eggs in accordance with the present invention.

Referring now to the drawings, and in particular to FIG. 1 the preferred form of the process of this invention is described as follows. A block of frozen eggs 10 shown at the upper left-hand corner of FIG. 1, are supplied to a riving machine 11 which fragments the frozen eggs and discharges the frozen fragments into a hopper 12. Of course, the eggs used may be in the form of egg parts and may be fresh as well as frozen. Heat is supplied to the egg fragments in the hopper 12 by hot water which is circulated through a jacket 13 surrounding the hopper, the charge of frozen egg fragments in the hopper being continuously stirred as they thaw by means of a mixer or agitator 14 mounted on the hopper. Additional ingredients, for example, milk, butter, salt, pepper and other seasonings are charged into the hopper 12 in measured amounts during the stirring operation to thereby form a thoroughly mixed slurry 15. The proportions of these additional ingredients may be varied and such variations will affect the viscosity of the slurry and the temperature to which it must be raised to produce the familiar scrambled egg product.

After being thoroughly mixed in the hopper, a centrifugal pump 16 pumps the slurry through a heat exchanger 17 where it is heated to a temperature below its coagulation point, approximately 140° F. It is important that the temperature of the slurry, at this point in the process, not be raised much above 140° F. because coagulation of the slurry begins at about this temperature. If the slurry begins to coagulate at this point, it would become difficult to pump and the final product would be adversely affected. Of course, the coagulation temperature of the slurry depends upon the nature and the proportions of the slurry's ingredients. It is advantageous to preheat the slurry to approximately 140° F. to minimize dilution of the slurry by condensed steam when the slurry is subsequently cooked. Further, when the slurry is uniformly preheated to a certain temperature, the dilution is uniform in amount in the final product. Therefore, it is preferable, depending upon the ingredients and their proportions as further described herein, for the temperature of the slurry to be maintained at approximately 140° F. at this stage in the process and preferably within the temperature range of from substantially 135° to substantially 145° F.

The slurry is homogenized to maintain its ingredients in suspension while it is being cooked. To this end, the slurry is pumped from the heat-exchanger 17 through a surge chamber 18 and then through a conventional homogenizer 19 by a positive-displacement pump 20. The rate of output of pump 20 determines the discharge rate of the final product, therefore, the pump is regulated to the speed of the conveyor tray line 25.

After the slurry is homogenized, it is pumped through insulated tubing 21 to a location where it is scrambled, coagulated and dispensed into food receptacles. In the present instance, the egg slurry is scrambled and cooked in a coagulating-chamber 22 (FIGS. 1 and 2) disposed above a hopper 23 which briefly holds the cooked product before it is dispensed in measured amounts onto foil trays 24, 24 advancing to the right as shown in FIG. 1 under the hopper on a conveyor belt 25. The quantity of product dispensed onto each tray is controlled by a gate 26 at the bottom of the hopper 23, the gate being mechanically actuated by means well known in the art. A positive displacement dispenser may also be used to accurately measure and timely dispense the product into the moving trays 24. The filled trays 24 then pass into a freezing chamber 27 where they are sealed and prepared for shipment.

Figure 2:
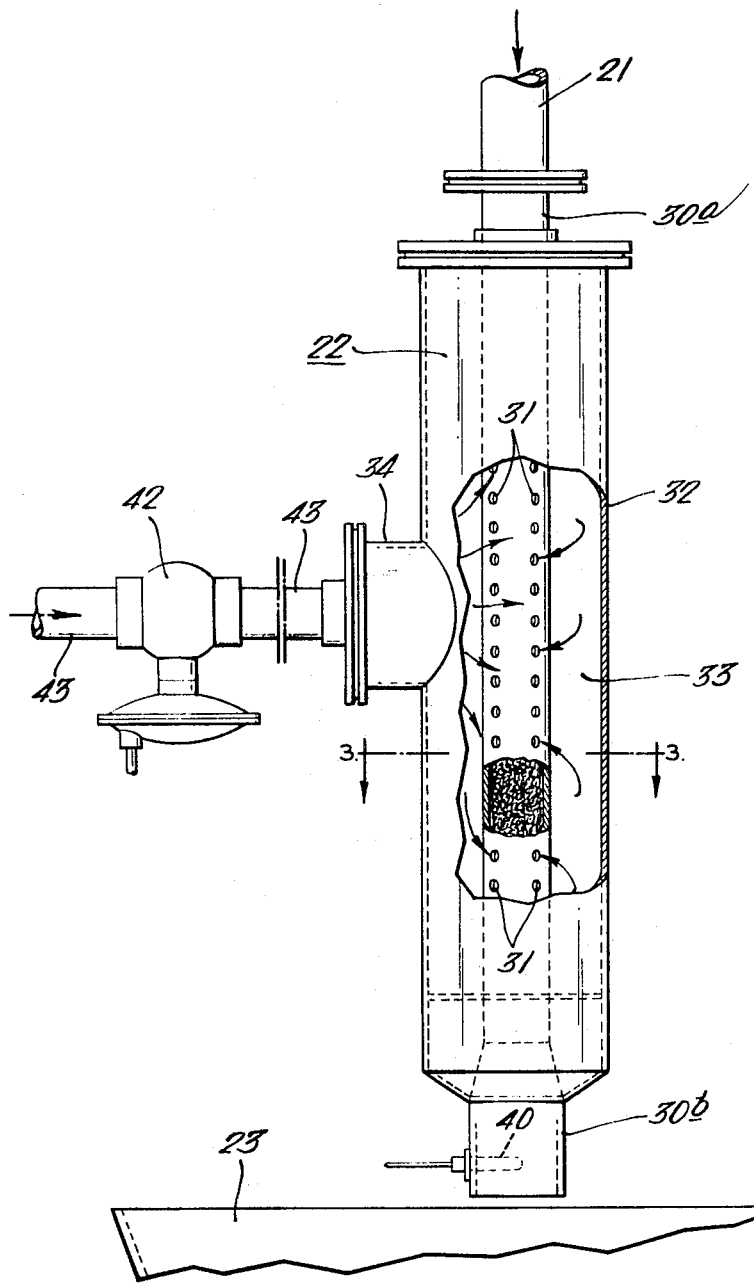
FIG. 2 is a side elevational view of a coagulating-chamber employed in the present invention with portions broken away and sectioned to illustrate its interior construction.
Figure 3:
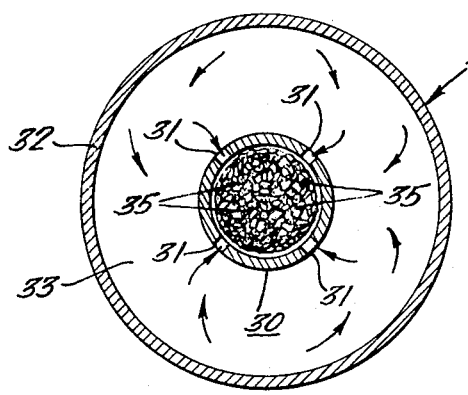
FIG. 3 is a sectional view taken along line 3—3 of FIG. 2 and illustrating steam flowing inwardly against an egg slurry which is being scrambled and cooked.

The slurry is scrambled and cooked by steam as it descends through the coagulating-chamber 22 as shown in greater detail in FIG. 2. Coagulating-chamber 22 comprises a perforated center tube 30 having a vertically disposed portion connected at its upper end 30a to the insulated tubing 21 and open at its lower or discharge end 30b into the hopper 23. A jacket 32 surrounds the tube 30 along its length to define a steam chamber 33 therealong with steam being supplied to the steam chamber 33 through a lateral fitting 34 intermediate its ends. Steam is admitted to the interior of the tube 30 through a series of radial orifices 31, 31 spaced apart about the periphery of the tube 30 and at intervals along its length. The orifices are of uniform diameter and directed perpendicularly to the axis of the tube 30 which is preferably made of TEFLON material. Thus, when steam is supplied to the steam chamber 33, the steam flows inward through the orifices 31, 31 and laterally strikes the descending slurry. The slurry is thereby broken up and dispersed into small, curdlike particles 35, 35 (FIGS. 2 and 3) which are cooked as they intimately contact the steam. In this manner, the inwardly flowing steam coagulates, cooks and breaks up the egg slurry into the familiar scrambled egg product as the slurry descends in tube 30.

In accordance with the present invention, the scrambling and cooking of the egg slurry must be carried on within a carefully controlled temperature range for a limited period of time if satisfactory results are to be achieved. To this end, it has been found that proper temperature control may be effected by measuring the temperature of the product as it is discharged from the coagulating-chamber and regulating the supply of steam thereto in response to the measured temperature. Although the relative proportions of the ingredients affect the preferred cooking temperature, the temperature of the discharged product for the slurry described below should be maintained in the range of substantially 182° to substantially 186° F., the criticality of this temperature range being demonstrated by the following examples. The flow of the slurry through the coagulating-chamber is very rapid and variations in the rate of flow do not substantially affect the temperature cooking range.

EXAMPLE I

A slurry comprising by weight: 60 parts frozen whole eggs, 17 parts milk, 18 parts butter or margarine, and a small percentage of seasoning was prepared and homogenized at 140° F. The slurry was pumped to a coagulating-chamber having a tube three-fourths inches in diameter and 16 inches long with 100 orifices one-sixteenth inch in diameter spaced apart around the periphery of the tube at ½-inch intervals in four rows 90° apart along its entire length. Steam at a temperature of 250° F. and pressure of 15 lbs. per sq. in. was supplied to the orifices as the slurry descended through the tube, and the temperature of the cooked product was maintained at substantially 190° F. as it was discharged from the coagulating-chamber. The product was then frozen at a temperature of 0° F. and was reheated in an oven at a temperature of 450° F. for 20 minutes. The reheated product was unsatisfactory because the texture of the finished egg product was tough caused by overcooking.

EXAMPLE II

A slurry according to example I was prepared and homogenized and was supplied to the coagulating-chamber as described above at 140° F. The temperature of the cooked product was maintained at a discharge temperature of substantially 180° F. The product was unsatisfactory after it was frozen and reheated because the texture of the egg product was not characteristic of "scrambled eggs." An insufficient amount of curds had been formed due to a lack of sufficient heat.

EXAMPLE III

A slurry in accordance with examples I and II was prepared, homogenized, and was supplied to the coagulating-chamber at 140° F. The cooked product was maintained at a discharge temperature of substantially 184° F. Unlike the previous examples, this product was satisfactory upon reheating after freezing because a proper amount of heat had been supplied during the coagulating process.

Therefore, in view of the foregoing examples, it may be seen that the cooking temperature for the stated ingredients and their proportions is critical, and the cooking temperature may be controlled by reference to the temperature of the cooked product as it is discharged from the coagulating-chamber.

In the preferred embodiment of the present invention, means is provided to automatically maintain the temperature of the cooked product in the aforementioned critical range. To this end, conventional temperature sensing bulb 40 (FIGS. 1 and 2) is disposed across the path of movement of the product to sense its temperature as it is discharged from the lower end of the scrambling and cooking chamber. The temperature sensing bulb 40 is connected to conventional controller means 41 (FIG. 1) which in turn is connected to a valve 42 in a steam supply line 43 to regulate the supply of steam to the steam chamber 33. In the present instance, the controller means 41 increases the opening in valve 42 and supplies steam to the chamber 33 when the temperature sensed by bulb 40 drops below 184° F. and the controller means modulates the valve 42 to adjust the flow of steam to the chamber 33 when the temperature sensed by the bulb increases beyond 184° F. In this manner, the temperature of the cooked product is maintained within the aforementioned critical temperature range to produce scrambled eggs having a curdlike texture and a pleasing appearance.

In view of the foregoing, it may be seen that a novel method has now been provided for continuously scrambling and cooking eggs to permit large production amounts of scrambled eggs to be produced while still retaining the typical appearance and pleasant taste of eggs scrambled in small quantities in a frying pan.

The cooked product must not be held in the hopper 23 at a high temperature for any length of time because the eggs will continue to cook and will become tough to the taste. In the preferred process the hopper 23 holds the product only briefly while measured quantities are being continuously dispensed on to the trays 24. The temperature of the product then quickly drops so that further cooking is effectively stopped.

Although the coagulating-chamber 22 is shown and described in the preferred embodiment as disposed vertically with the slurry descending while steam passes radially and laterally into the flow, the process may be varied without varying the results. For example, the slurry may flow upwardly or even horizontally in a coagulation-chamber and the steam may be introduced at various angles relative to the direction of slurry flow. Further, the steam may be introduced into the slurry in directions other than described and the walls of tube 30 are not heating surfaces so that the coagulating slurry will not stick on them and block the flow of slurry in the tube.

In the examples stated, the temperature of the product as it passed out of the chamber was shown to be highly important if the product was to be pleasing in texture and taste. However, the preferred temperature must be considered as one falling within a range between the limits of approximately 175° to 195° F., because this temperature is affected by the ingredients and their proportions. For example, if the proportion of milk or butter were raised, then the desired temperature, or heat required to coagulate and cook the slurry, would increase. On the other hand, if the proportion of egg content were increased, then less heat would be required. Even though these variables are shown to affect the exact cooking temperature, the range of temperature disclosed, when applied to the described slurry, produces an excellent scrambled egg product both in taste and appearance.

While preferred embodiments of the present invention have been described in detail, various modifications, alterations or changes may be made without departing from the spirit and scope of the present invention.

The following is claimed:

1. A process for continuously producing a product having the appearance and taste of scrambled eggs from a slurry comprising approximately 60 parts by weight eggs, 17 parts by weight milk, 18 parts by weight butter or margarine and a small percentage of seasoning, the steps comprising:
   preheating the slurry to a temperature below its coagulating temperature,
   thereafter passing the slurry through a coagulating-chamber while introducing steam into the slurry to cook and simultaneously with cooking disperse the slurry into small, curdlike particles, and
   regulating the steam introduced into the slurry so as to maintain the temperature of the coagulated product within a range of substantially 175° to 195° F. as the product is discharged from the chamber.

2. The process as defined in claim 1 wherein the slurry is preheated to a temperature within the range of substantially 135° to 145° F.

3. The process as defined in claim 1 wherein the steam introduced into the slurry is at a temperature of approximately 250° F. and a pressure of 15 pounds per square inch.

4. The process as defined in claim 1 wherein the steam is introduced into the slurry from different directions so that the steam becomes intimately mixed in the egg slurry and the coagulated egg particles.

5. A process for continuously producing a product having the appearance and taste of scrambled eggs from a slurry comprising approximately 60 parts by weight eggs, 17 parts by weight milk, 18 parts by weight butter or margarine and a small percentage of seasoning, the steps comprising:
   homogenizing the slurry,
   preheating the slurry to a temperature of approximately 140° F.,
   passing the slurry through a coagulating-chamber while introducing steam into the slurry from different directions to intimately mix the steam with the slurry so as to cook and simultaneously with cooking disperse the slurry into small, curdlike particles, and
   regulating the steam introduced into the slurry so as to maintain the temperature of the coagulated product at approximately 184° F. as the product is discharged from the chamber.

6. The process for continuously producing a product having the appearance and taste of scrambled eggs comprising:
   forming and thoroughly mixing a slurry consisting of eggs, milk, butter or margarine,
   preheating the slurry to a temperature below its coagulation temperature,
   thereafter passing the slurry through a coagulating-chamber while introducing steam into the slurry to cook and simultaneously with cooking disperse the slurry into small curdlike particles,
   measuring the temperature of the cooked slurry as it leaves the coagulating-chamber, and
   regulating the steam introduced into the slurry in response to the measured temperature to maintain the temperature of the coagulated product within a range of substantially 175° to 195° F. as the product leaves the coagulating-chamber.

7. The process as defined in claim 6 wherein the slurry is preheated to a temperature within the range of substantially 135° to 145° F.

8. The process as defined in claim 6 wherein the steam introduced into the slurry is regulated to maintain the temperature of the coagulated product at approximately 184° F. as the product is discharged from the coagulating-chamber.

* * * * *